(12) United States Patent
Valente

(10) Patent No.: US 6,768,495 B2
(45) Date of Patent: Jul. 27, 2004

(54) PREPROCESSING METHOD APPLIED TO TEXTURES OF ARBITRARILY SHAPED OBJECTS

(75) Inventor: Stephane Edouard Valente, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 179 days.

(21) Appl. No.: 10/061,084

(22) Filed: Feb. 1, 2002

(65) Prior Publication Data

US 2002/0168114 A1 Nov. 14, 2002

(30) Foreign Application Priority Data

Feb. 6, 2001 (FR) .......................................... 01 400288

(51) Int. Cl.$^7$ ................................................ G09G 5/00
(52) U.S. Cl. ...................................... 345/619; 345/689
(58) Field of Search ................................ 345/427, 582, 345/586, 592, 615, 619, 654, FOR 110, FOR 111, FOR 119, FOR 211, FOR 214; 348/128, 394.1, 395.1, FOR 133, FOR 134, FOR 138; 382/108, 169, 243, 248, 250, 276–283, 302

(56) References Cited

U.S. PATENT DOCUMENTS 6,058,214 A * 5/2000 Bottou et al. ............... 382/240

OTHER PUBLICATIONS

Thomas Sikora and Bela Makai, Shape–Adaptive DCT for Generic coding of Video, Feb. 1995, IEEE, pp. 59–62.*
Chen, Civanlar and Haskell, A block Transform Coder for Arbitrarily Shaped Image Segments, 1994, IEEE, pp. 85–89.*

"A Projection Onto The Overcomplete Basis Approach For Block Loss Recovery", by J.H. Chang et al., Proceedings ICIP–97, Oct. 26–29, 1997, Santa Barbara, Calif., USA, vol. II, pp. 93–96.

* cited by examiner

*Primary Examiner*—Matthew C. Bella
*Assistant Examiner*—G. F. Cunningham

(57) ABSTRACT

The invention relates to a method of preprocessing data that correspond to arbitrarily shaped objects and comprise for each object a texture part and an object mask, said method comprising, for each object plane associated to an object, the steps of:

(1) partitioning the object plane into bidimensional blocks;

(2) introducing in each block a set of basis vectors chosen in order to express an estimate of the original pixel values as a linear combination of said basis vectors;

(3) defining a cost function $\psi$ to measure the distortion between the original expression of the pixel values and said estimate of this original expression;

(4) finding the coefficients allowing to minimize said cost function $\psi$, said finding step itself comprising the following operations: initialization, extraction of the basis vectors restricted to the opaque pixels and calculation of projection coefficients, iterations, and interruption of said iterations according to a predetermined criterion.

4 Claims, 2 Drawing Sheets

PREPROCESSING METHOD APPLIED TO TEXTURES OF ARBITRARILY SHAPED OBJECTS

FIELD OF THE INVENTION

The present invention relates to a method of preprocessing input data corresponding to picture elements (pixels) that represent arbitrarily shaped objects, said input data comprising for each object a texture part, corresponding to the values of the pixels of said object, and an object mask, subdividing said input data into a first and a second subset of data respectively corresponding to fully or partially opaque pixels and to transparent pixels in said texture part, said preprocessing method being provided for determining DCT (discrete cosine transform) coefficients corresponding to said opaque pixels and comprising for each considered object the steps of:

(1) partitioning the object plane into bidimensional blocks;
(2) introducing in the picture area defined by said block a set of basis vectors chosen in order to express an estimate of the original pixel values as a linear combination of said basis vectors;
(3) defining a cost function $\psi$ to measure the distortion between the original expression of the pixel values and said estimate of this original expression;
(4) finding the coefficients allowing to minimize the cost function $\psi$. This invention, which aims at efficiently encoding arbitrarily shaped textures, is useful especially in relation with the MPEG-4 standard, but without being restricted to such an application.

BACKGROUND OF THE INVENTION

The MPEG-4 standard, issued in 1999, was intended to propose a unified way for efficiently encoding visual objects in natural and synthetic pictures. For an encoder having to deal with these objects (generally made of several layers which in turn may contain arbitrarily shaped objects), they come in the form of two components: the object mask, which can be either binary or made of gray level pixels and represent the alpha channel values used by the decoder for the scene composition, and the texture part, i.e. the values of the pixels of the object (a white pixel in the mask means that the corresponding pixel in the texture part is opaque, thus replacing the pixels of any other object behind it in the layer hierarchy, while a black pixel means that the corresponding pixel in the texture part is fully transparent, i.e. not visible). The invention specifically addresses the encoding operation of the texture part.

For encoding moving textures in an MPEG-4 encoder, the conventional method is to use the DCT transform (discrete cosine transform) on image blocks. More precisely, the plane to be encoded is partitioned into macroblocks of size 16×16 pixels, and the 16×16 luminance information is further partitioned into four 8×8 blocks encoded by the bidimensional 8×8 DCT transform (the same 2D transform is used again for the two 8×8 blocks containing the U and V chrominance information). For arbitrarily shaped objects, any 8×8 block can fall into three categories: either it contains transparent pixels only (there is then no need to encode the texture information) or opaque pixels only (the standard rectangular 8×8 DCT is used to encode the texture information) or it contains at least an opaque pixel and a transparent one. The problem to be solved, in this third situation, is the efficient encoding of this partial texture information in terms of bit consumption.

First the textures can be classically DCT-encoded as rectangular macroblocks after the empty spaces have been filled in by extending the texture boundary pixels (each sample at the boundary of an opaque region is replicated horizontally to the left or right direction in order to replace the transparent areas, and the same process is repeated in the vertical direction, the obtained padding pixels being later removed by the decoder since it knows the object mask). This padding method however introduces patterns that may be not optimal from the point of view of the frequency spectrum (they may be flat in the horizontal direction and randomly varying in the vertical one and result in unwanted frequency components that consume more bits when the macroblocks are DCT-encoded).

Another solution, normalized within the MPEG-4 standard, is the so-called shape-adaptive DCT, that proceeds in two steps to encode the patterns of FIG. 1 (given as an illustration). As illustrated in FIG. 2, all opaque pixels are first shifted to the most upper position in the block to be encoded, and an adaptive one-dimensional n-DCT is then applied to each column, n being the number of opaque pixels in said column (in the example of FIG. 2, from left to right, the 1, 4, 7, 5, 7 and 1-DCT are respectively applied in the vertical direction). The resulting vertical DCT coefficients are then similarly shifted to the most left position in the block, which yields the pattern of FIG. 3, and the one-dimensional n-DCT is similarly applied to each row (n being the number of opaque pixels in the concerned row). Unfortunately, with this method, which needs special functionalities in the associated MPEG-4 decoder (as opposed to the classical 8×8 DCT algorithm used for fully opaque blocks), the shift operations generally introduce high frequencies as they concatenate pixels or coefficients that are spatially separated and have therefore little correlation.

SUMMARY OF THE INVENTION

It is therefore an object of the invention to propose a preprocessing method avoiding to introduce such undesirable frequencies and leading to a better coding efficiency.

To this end, the invention relates to a method such as defined in the introductory part of the description and which is moreover characterized in that:

(a) said cost function $\psi$ is given by a relation of the type:

$$\psi = \left( f_{opaque}, \sum_{i=1}^{64} c_i b_{opaque(i)} \right)$$

where f is the column-vector of the pixels of the concerned block, $((b_i), i \in (1 \text{ to } 64))$ are the basis vectors of a 8×8 DCT, $f_{opaque}$ is the restriction of f to the opaque pixels of said block, $((b_{opaque}), i \in (1 \text{ to } 64))$ are the restriction of said basis vectors to the location of the opaque pixels of the block, and $$\sum_{i=1}^{64} c_i b_{opaque(i)}$$

is called the reconstruction of $f_{opaque}$;
(b) said finding step itself comprises the following operations:
initialization of the following parameters, including:
iteration parameter k=0;

initial estimation of $f_{opaque}^E=0$;
initial reconstruction coefficients $c_i^0=0$;
extraction of the basis vectors restricted to the opaque pixels and calculation of the projection coefficients:

$$P_i^0=\{(f_{opaque}-f_{opaque}^E), b_{opaque(i)}\}$$

with { } denoting the cross-correlation function, i varying from 1 to 64, and ($b_{opaque}$) being said restricted basis vectors;

iteration(s), each of said iteration being provided for performing the following sub-steps:
[a] finding the index i* of the basis vector which best contributes to minimize the cost function;
[b] updating the reconstruction of $f_{opaque}^E$ according to the relation:

$$f_{opaque}^E(k+1)=f_{opaque}^E(k)+p_i^k \cdot b_{opaque(i)}$$

[c] and updating the reconstruction coefficients $C_i^{k+1}=c_i^k$ for $i \neq i^*$ and $c_{i^*}^{k+1}=c_{i^*}^k+p_{i^*}^k$ and the projection coefficients $p_{i^*}^{k+1}$;

interruption of said iterations if said cost function $\psi$ is below a given threshold or if a predetermined number of iterations is reached.

BRIEF DESCRIPTION OF THE DRAWINGS

The present invention will now be described, by way of example, with reference to the accompanying drawings in which.

DETAILED DESCRIPTION OF THE INVENTION

Figure 1:
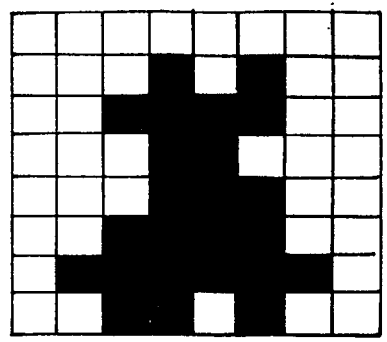
FIGS. 1 to 3 illustrate a prior art method (shape-adaptive DCT) used to encode the texture pixels of an arbitrarily shaped object.
Figure 2:
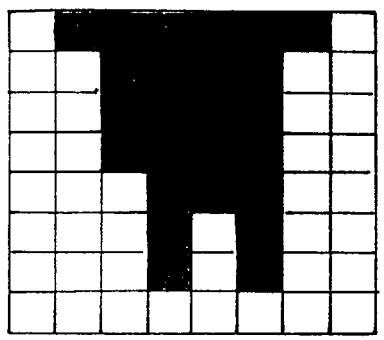
Figure 3:
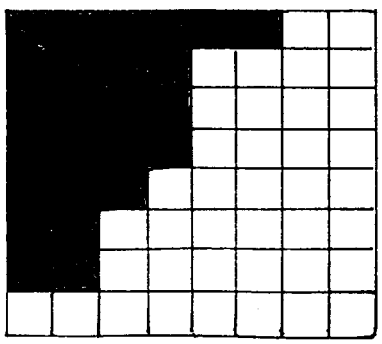

The preprocessing method according to the invention is based on the classical 8×8 DCT transform, in order to take advantage of the existing decoder structure as defined in the MPEG-4 standard, but it provides a better coding efficiency by computing the DCT coefficients that best reconstruct the opaque pixels regardless of the transparent ones, while minimizing the number of non-zero coefficients. Said method is an adaptation of the approach described in "A projection onto the overcomplete basis approach for block loss recovery", by J. H. Chang and al., Proceedings ICIP-97, Oct. 26–29, 1997, Santa Barbara, Calif., U.S.A., vol. II, pp. 93–96.

According to this proposed adaptation of the method described in said document, originally intended to be a concealment technique of the missing information in case of corrupted MPEG-4 video streams (in such a case, even a small error in such streams propagates to a great number of blocks, and it is necessary to identify and recover damaged image blocks), the basic idea is to obtain an estimation of the non-damaged original pixel values from a series of undamaged values, by introducing an overcomplete basis, expressing an estimate for a layer block as a linear combination of the basis vectors and finding the projections coefficients of the basis vectors in order to minimize a distorsion measure. With the following notations:

D=a damaged block
N=the undamaged neighbourhood of said block
U=union of D and N (=the larger block)

it is indeed proposed to estimate from the undamaged neighbourhood information N the larger block U containing the concerned damaged block D. If $f=(f_{i,j},(i,j)) \in U$ designates the non-damaged original pixel values (with $i,j \in N$), the task is therefore to estimate f. As the pixel values in N are known, a measure of the distortion of the estimate $f^E$ of f can be contemplated, and the distortion measure is defined as the following square difference:

$$\psi(f^E) = \|f - f^E\|_N^2 = \sum_{i,j} (f_{i,i} - f_{i,j}^E)^2$$

If $(b)_l=(b_{i,j}^l)$ is a basis of U and the set of the basis vectors is chosen to express the original f as a linear combination of the basis vectors, due to interblock correlation and in consideration of some associated assumptions, a damaged block and its neighbourhood are likely to have similar spectral characteristics. Hence the projection coefficient:

$$<f,b_l>_N=\Sigma_{i,j} f_{i,j} \cdot b_{i,j}^l (i,j \in N)$$

can be a good estimate of the original coefficient:

$$<f,b_l>_u=\Sigma_{i,j} f_{i,j} \cdot b_{i,j}^l (i,j \in U)$$

Consequently, if the coefficients $a'_l S$ are such that $f_N^E=\Sigma_l a_l b_l$ is a good approximation of $f_N$, then $f_U^E=\Sigma_l a_l b_l$ will be a good estimate of $f_U$ (the subscripts N and U indicating the domain of the vectors).

The problem of recovering a damaged block is then to find these coefficients $a_l$'s allowing to minimize $\psi$, which is possible with the iterative algorithm described in the document. According to the preprocessing method which is the object of the present invention, the problem is now reformulated with modified notations and considerations:

f is now the column-vector of the pixels of the macroblock to be encoded;
$f_{opaque}$ is the restriction of f to the opaque pixels of said macroblock;
B designates the basis functions of the 8×8 DCT transform: $B=(b_i)$, $i \in (1$ to $64)$;
$B_{opaque}=(b_{opaque(i)})$, $i \in (1$ to $64)$, designates the restriction of these basis vectors to the location of opaque pixels.

Said problem is then to find a compact set of coefficients ($c_i$) that best reconstruct $f_{opaque}$ in the least mean square sense, by minimizing the cost function $$\psi = \left\| f_{opaque} - \sum_{i=1}^{64} c_i b_{opaque_i} \right\|^2$$

with the maximum number of zero coefficients.

Figure 4:
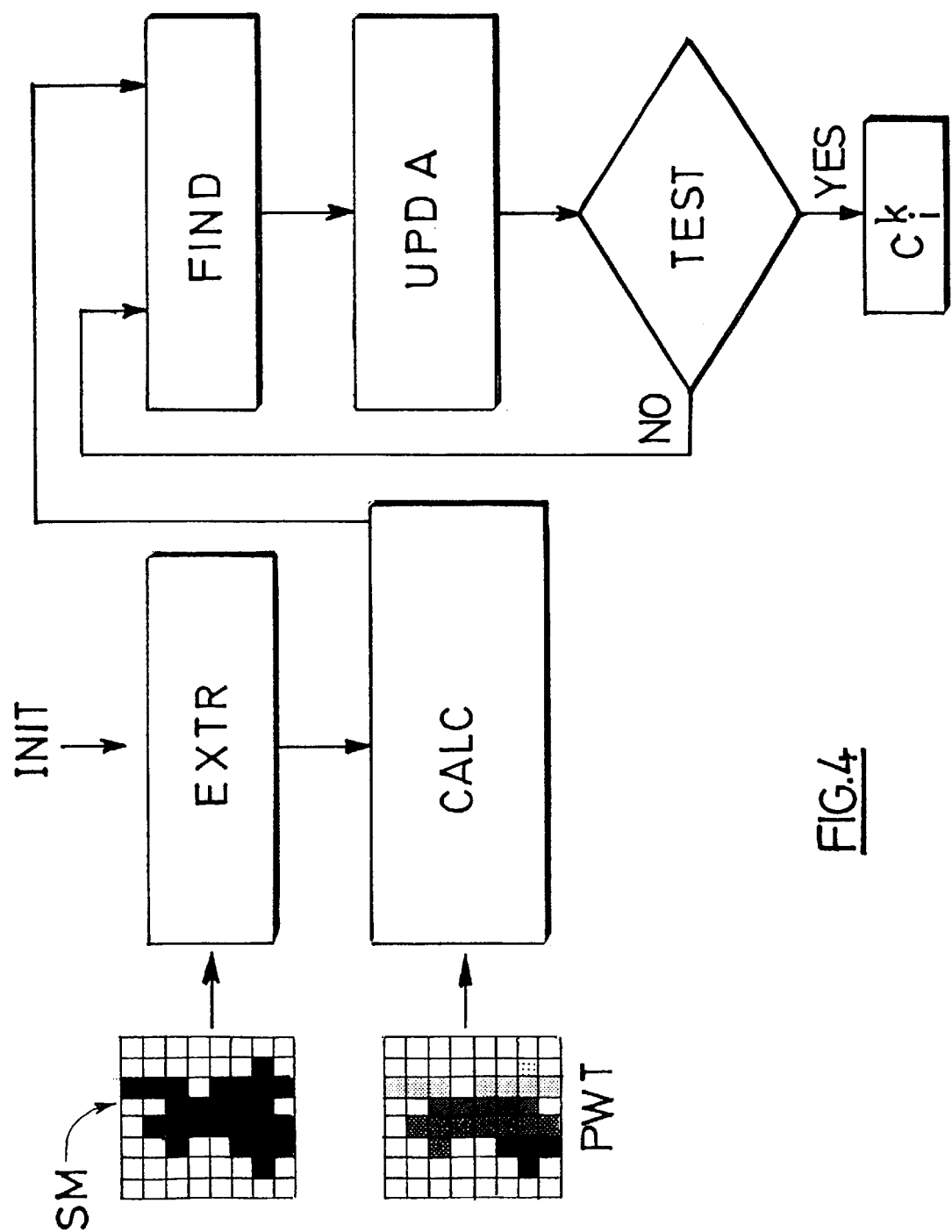
FIG. 4 illustrates a flowchart giving the main steps of a preprocessing method according to the invention.

If the macroblock f was fully opaque, there would exist a unique combination of DCT coefficients capable to reconstruct all pixels (this is the rectangular 8×8 DCT). But if only the reconstruction of a specific part of f is wanted, there exists an infinity of DCT coefficients that can reconstruct a block containing the same opaque pixels. In fact, the determination of the right DCT coefficients (and the most compact set of coefficients) is not explicit, because the basis functions of the DCT transform are no longer orthonormal when restricted to the location of opaque pixels. In order to find the coefficients that minimize the cost function $\psi$, the following iterative algorithm, which sequentially searches for a projection coefficient with the maximum energy, is now proposed (it is depicted in FIG. 4):

(1) first step (initialization NT)
   k=0 (number of iterations)
   $f_{opaque}^E = 0$ (initial estimation of $f_{opaque}$)
   $c_i^0 = 0$ (initial reconstruction coefficients)
(2) second step (extraction sub-step EXTR and calculation sub-step CALC): the projection coefficients $p_i^0 = \{(f_{opaque} - f_{opaque}^E), b_{opaque(i)}\}$ are calculated, with { } denoting the cross-correlation function, i varying from 1 to 64, and ($b_{opaque(i)}$) being the extracted 8×8 DCT basis vectors restricted to the opaque pixels (pixels PWT with texture, delimited by the shape mask SM).
(3) third step (k iterations, in view of the estimation), each iteration, and for instance the k-th one, itself comprising the operations of:
   (a) finding the index i* of the basis vector (sub-step FIND) which captures the maximum energy of the residual:

$i^* = \arg\max \|p_i^k \cdot b_{opaque(i)}\|^2$ for $i=1$ to 64

(b) updating the reconstruction of $f_{opaque}^E$ (in sub-step UPDA), according to the relation:

$f_{opaque}^E(k+1) = f_{opaque}^E(k) + p_i^k \cdot b_{opaque(i)}$ (c) updating the reconstruction coefficients $c_i^{k+1} = c_i^k$ for $i \neq i^*$ and $c_{i^*}^{k+1} = c_{i^*}^k + p_{i^*}^k$ (in sub-step UPDA);
   (d) updating (in sub-step UPDA) the projection coefficients of the residual:

$p_i^{k+1} = \{f_{opaque} - (f_{opaque}^E(k+1), b_{opaque(i)}\}$ $p_i^{k+1} = \left\{ f_{opaque} - \sum_{j=1}^{j=64} p_j^k \cdot (b_{opaque(j)} - ((p_{i^*}^k \cdot b_{opaque(i^*)}), b_{opaque(i)})) \right\}$ $P_i^{k+1} = P_i^k - P_i^k \{b_{opaque(i^*)}, b_{opaque(i)}\}$ (4) fourth step (interruption test of the iterative algorithm, or sub-step TEST), in which, if the residual is below a given threshold $\epsilon$:

$\psi^{k+1} = |f_{opaque} - f_{opaque}^E(k+1)| \leq \epsilon$ or if a predetermined number of iterations $k_{max}$ is reached, the iterative process stops (reply YES to the test), otherwise it continues (reply NO to the test) by repetition of the third step (3) as long as none of these conditions is satisfied. At the end of the implementation of the algorithm, the $c_i^k$ are the 8×8 DCT coefficients that will produce the opaque pixels of the arbitrary shape.

The preprocessing method thus described may then be followed by the usual operations generally provided for texture encoding: quantization, individual coefficient prediction (if needed) in order to further reduce their entropy, scanning and variable length encoding of the coefficients, as provided for the DCT coefficients of a fully opaque block in a conventional MPEG coding strategy. While the present invention has been described above in relation with the specific example of the MPEG-4 standard, it is to be understood that the invention is not intended to be confined or limited to it \: the invention is not limited to any specific coding strategy then used on the obtained output bitstream.

What is claimed is:
1. A method of preprocessing input data corresponding to picture elements (pixels) that represent arbitrarily shaped objects, said input data comprising for each object a texture part, corresponding to the values of the pixels of said object, and an object mask, subdividing said input data into a first and a second subset of data respectively corresponding to fully or partially opaque pixels and to transparent pixels in said texture part, said preprocessing method being provided for determining DCT (discrete cosine transform) coefficients corresponding to said opaque pixels and comprising for each considered object the steps of:
   (1) partitioning the object plane into bidimensional blocks;
   (2) introducing in the picture area defined by said block a set of basis vectors chosen in order to express an estimate of the original pixel values as a linear combination of said basis vectors;
   (3) defining a cost function $\psi$ to measure the distortion between the original expression of the pixel values and said estimate of this original expression;
   (4) finding the coefficients allowing to minimize the cost function $\psi$; characterized in that:
      (a) said cost function $\Psi$ is given by a relation of the type:

$\psi = \left( f_{opaque}, \sum_{i=1}^{64} c_i b_{opaque(i)} \right)$ where f is the column-vector of the pixels of the concerned block, $((b_i), i \in (1$ to $64))$ are the basis vectors of a 8×8 DCT, $f_{opaque}$ is the restriction of f to the opaque pixels of said block, $((b_{opaque}), i \in (1$ to $64))$ are the restriction of said basis vectors to the location of the opaque pixels of the block, and $\sum_{i=1}^{64} c_i b_{opaque(i)}$ is called the reconstruction of $f_{opaque}$;
      (b) said finding step itself comprises the following operations:
         initialization of the following parameters, including:
            iteration parameter k=0;
            initial estimation of $f_{opaque}^E = 0$;
            initial reconstruction coefficients $c_i^0 = 0$;
         extraction of the basis vectors restricted to the opaque pixels and calculation of the projection coefficients:

$p_i^0 = \{(f_{opaque} - f_{opaque}^E), b_{opaque(i)}\}$ with { } denoting the cross-correlation function, i varying from 1 to 64, and ($b_{opaque}$) being said restricted basis vectors;
         iteration(s), each of said iteration being provided for performing the following sub-steps:
            [a] finding the index i* of the basis vector which best contributes to minimize the cost function;
            [b] updating the reconstruction of $f_{opaque}^E$ according to the relation:

$f_{opaque}^E(k+1) = f_{opaque}^E(k) + p_i^k \cdot b_{opaque(i)}$

[c] and updating the reconstruction coefficients $c_i^{k+1} = C_i^k$ for $i \neq i^*$ and $c_{i^*}^{k+1} = c_{i^*}^k + p_{i^*}^k$ and the projection coefficients $p_{i^*}^{k+1}$;
            interruption of said iterations if said cost function $\psi$ is below a given threshold or if a predetermined number of iterations is reached.

2. A preprocessing method according to claim 1, characterized in that the cost function is defined by the relation:

$$\psi = \left\| f_{opaque} - \sum_{i=1}^{64} c_i b_{opaque(i)} \right\|^2$$

and the sub-step is provided for finding the index i* of the basis vector which captures the maximum energy of the residual $$f_{opaque} - \sum_{i=1}^{64} c_i b_{opaque(i)}:$$

$i^* = \arg\max \| p_i^k \cdot b_{opaque(i)} \|^2$ for $i=1$ to 64.

3. A method of coding input data corresponding to the texture of arbitrarily shape objects, said coding method including at least a DCT transform of said texture input data, a quantization of the coefficients obtained from said transform, a differential prediction of the data to be coded, and a variable length encoding operation of said quantized coefficients, characterized in that said DCT coefficients are the coefficients $c_i^k$ obtained by implementation of a preprocessing method according to claim 1 and corresponding to the opaque pixels of the arbitrarily shaped objects.

4. An encoding device for coding input data corresponding to the texture of arbitrarily shape objects, said encoding device including at least means for implementing a DCT transform of said texture input data, a quantization of the coefficients obtained from said transform, a differential prediction of the data to be coded, and a variable length encoding operation of said quantized coefficients, characterized in that said DCT coefficients are the coefficients $c_i^k$ obtained by implementation of a preprocessing method according to claim 1 and corresponding to the opaque pixels of the arbitrarily shaped objects.

* * * * *